US012634759B2

(12) United States Patent　(10) Patent No.:　US 12,634,759 B2
Wu et al.　(45) Date of Patent:　May 19, 2026

(54) SYSTEM AND METHOD FOR COMMUNICATION LOAD BALANCING IN UNSEEN TRAFFIC SCENARIOS

(71) Applicant: SAMSUNG ELECTRONICS CO., LTD., Suwon-si (KR)

(72) Inventors: Di Wu, Saint-Laurent (CA); Yi Tian Xu, Montreal (CA); Jimmy Li, Longueuil (CA); Tianyu Li, Montreal (CA); Jikun Kang, Montreal (CA); Xue Liu, Montreal (CA); Xi Chen, Montreal (CA); Gregory Lewis Dudek, Westmount (CA); Seowoo Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 740 days.

(21) Appl. No.: 17/872,667

(22) Filed: Jul. 25, 2022

(65) Prior Publication Data

US 2023/0047986 A1　Feb. 16, 2023

Related U.S. Application Data

(60) Provisional application No. 63/227,951, filed on Jul. 30, 2021.

(51) Int. Cl.
*H04W 28/08*　(2023.01)
*H04W 28/086*　(2023.01)

(52) U.S. Cl.
CPC ... *H04W 28/0942* (2020.05); *H04W 28/0861* (2023.05)

(58) Field of Classification Search
CPC ..................... H04W 28/0942; H04W 28/0861
See application file for complete search history.

(56) References Cited

U.S. PATENT DOCUMENTS 8,285,874 B2　10/2012　Salmi et al.
10,153,978 B1 *　12/2018　Di Proietto ........... H04L 45/306
(Continued)

FOREIGN PATENT DOCUMENTS

WO　2020/246918 A1　12/2020

OTHER PUBLICATIONS

International Search Report (PCT/ISA/220 and PCT/ISA/210) and Written Opinion (PCTISA237) dated Nov. 1, 2022, issued by the International Searching Authority in International Application No. PCT/KR2022/011306.

*Primary Examiner* — Hoang-Chuong Q Vu
(74) *Attorney, Agent, or Firm* — Sughrue Mion, PLLC

(57) ABSTRACT

Several policies are trained for determining communication parameters used by mobile devices in selecting a cell of a first communication network to operate on. The several policies form a policy bank. By adjusting the communication parameters, load balancing among cells of the first communication network is achieved. A policy selector is trained so that a target communication network, different than the first communication network, can be load balanced. The policy selector selects a policy from the policy bank for the target communication network. The target communication network applies the policy and the load is balanced on the target communication network. Improved load balancing leads to a reduction of the number of base stations needed in the target communication network.

16 Claims, 15 Drawing Sheets

(56)　　　　　References Cited

U.S. PATENT DOCUMENTS

| | | | | |
|---|---|---|---|---|
| 2010/0211637 | A1* | 8/2010 | Borzsei | H04L 67/51 |
| | | | | 709/204 |
| 2013/0130670 | A1* | 5/2013 | Samdanis | H04W 24/02 |
| | | | | 455/418 |
| 2014/0329485 | A1* | 11/2014 | Calin | H04L 63/1475 |
| | | | | 455/296 |
| 2015/0081893 | A1* | 3/2015 | Chadwell | G06F 3/0659 |
| | | | | 709/224 |
| 2017/0180257 | A1 | 6/2017 | Guichard et al. | |
| 2018/0234296 | A1* | 8/2018 | Kasberg | H04L 41/0893 |
| 2019/0068679 | A1* | 2/2019 | Subramaniam Natarajan | |
| | | | | H04L 65/612 |
| 2019/0140863 | A1 | 5/2019 | Nainar et al. | |
| 2019/0208445 | A1* | 7/2019 | Klatsky | H04L 65/752 |
| 2020/0029240 | A1* | 1/2020 | Li | H04W 24/02 |
| 2020/0351201 | A1* | 11/2020 | Li | G06F 11/3006 |
| 2020/0382189 | A1* | 12/2020 | Chen | H04B 7/0617 |
| 2021/0051519 | A1 | 2/2021 | Bedekar et al. | |
| 2021/0084557 | A1 | 3/2021 | Song et al. | |
| 2021/0211371 | A1* | 7/2021 | Ceccarelli | H04L 45/64 |
| 2021/0385712 | A1* | 12/2021 | Acar | H04W 84/12 |
| 2022/0046084 | A1* | 2/2022 | Nair | H04N 21/4334 |
| 2023/0028393 | A1* | 1/2023 | Lee | H04W 48/20 |
| 2023/0179490 | A1* | 6/2023 | Huangfu | H04W 24/02 |
| | | | | 370/252 |

* cited by examiner

Algorithm 2: Training a policy with Proximal Policy Optimization (PPO)

Input: Training environment $E$
Output: Policy $\pi$
begin

Create a policy $\pi_{\theta_0}$ with initial parameters $\theta_0$
Create a value function $v_{\phi_0}$ with initial parameter $\phi_0$
for $i = 0$ *to* $N_e$ do

Collect a set of trajectories $D = \{T_1, ..., T_{N_t}\}$ by running $\pi_{\theta_i}$ in environment $E$ Compute the advantage estimate $\hat{A}$ using $v_{\phi_i}$ Update the policy parameter by optimizing the PPO-clip loss:

$$\theta_{i+1} \leftarrow \arg\max_{\theta} \frac{1}{N_t T} \sum_{T_j \in D} \sum_{t=0}^{T} \min\left( \frac{\pi_\theta(a_{j,t} \mid s_{j,t})}{\pi_{\theta_i}(a_{j,t} \mid s_{j,t})} \hat{A}(s_{j,t}, a_{j,t}), g(\varepsilon, \hat{A}(s_{j,t}, a_{j,t})) \right)$$

where $$g(\varepsilon, A) = \begin{cases} (1+\varepsilon)A & A \geq 0 \\ (1-\varepsilon)A & A < 0 \end{cases}$$

Update the value function parameter by optimizing the mean squared error loss:

$$\phi_{i+1} \leftarrow \arg\min_{\phi} \frac{1}{N_t T} \sum_{T_j \in D} \sum_{t=0}^{T} (v_\phi(s_{j,t}) - r_{j,t})^2$$

Figure 4C:
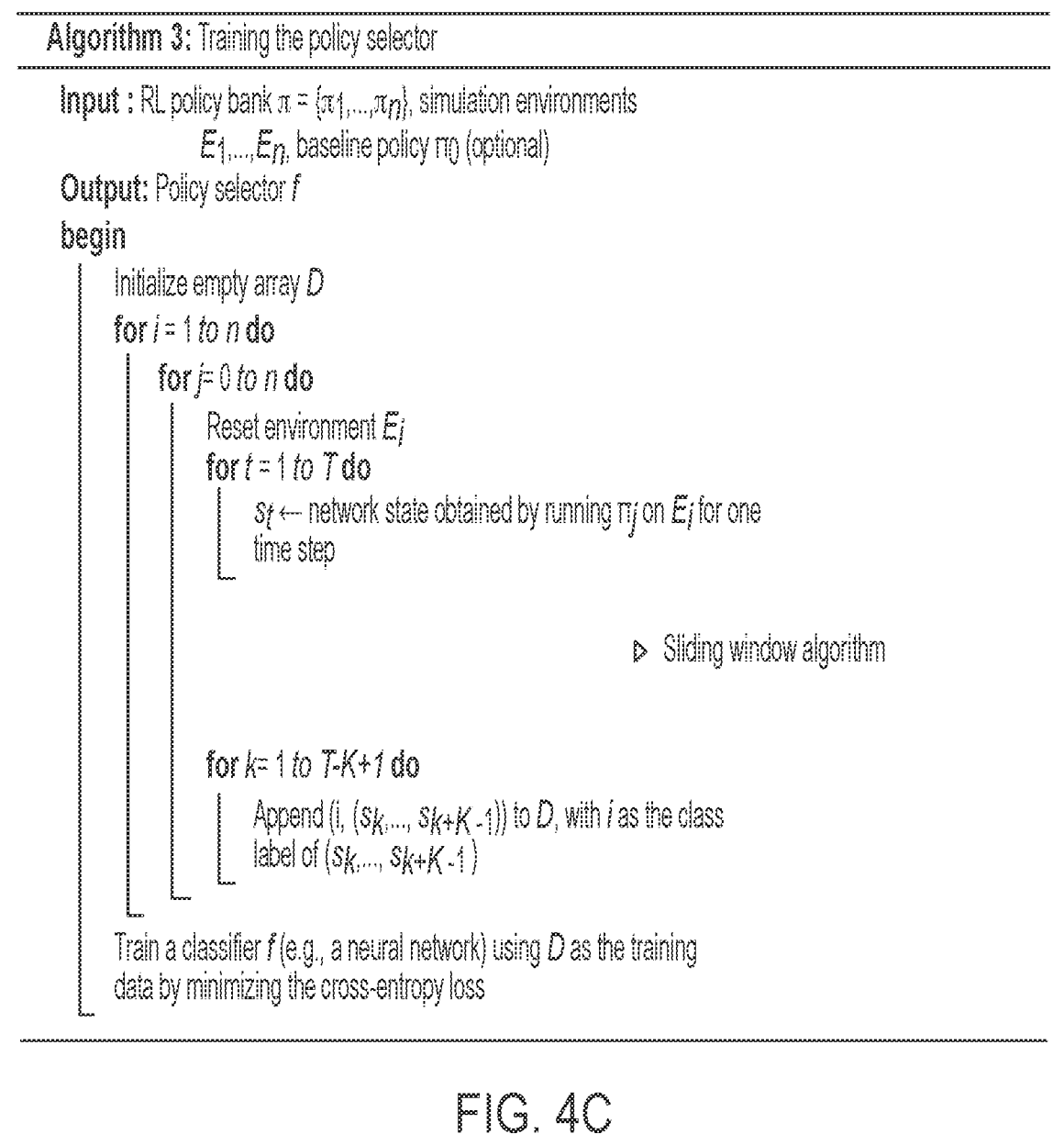

Algorithm 3: Training the policy selector

---

Input : RL policy bank $\pi = \{\pi_1,...,\pi_n\}$, simulation environments
$\quad\quad\quad E_1,...,E_n$, baseline policy $\pi_0$ (optional)

Output: Policy selector $f$ begin

Initialize empty array $D$ for $i = 1$ *to* $n$ do for $j = 0$ *to* $n$ do

Reset environment $E_i$ for $t = 1$ *to* $T$ do

$s_t \leftarrow$ network state obtained by running $\pi_j$ on $E_i$ for one
                time step $\triangleright$ Sliding window algorithm for $k = 1$ *to* $T\text{-}K\text{+}1$ do

Append $(i, (s_k,..., s_{k+K-1}))$ to $D$, with $i$ as the class
                label of $(s_k,..., s_{k+K-1})$ Train a classifier $f$ (e.g., a neural network) using $D$ as the training
    data by minimizing the cross-entropy loss

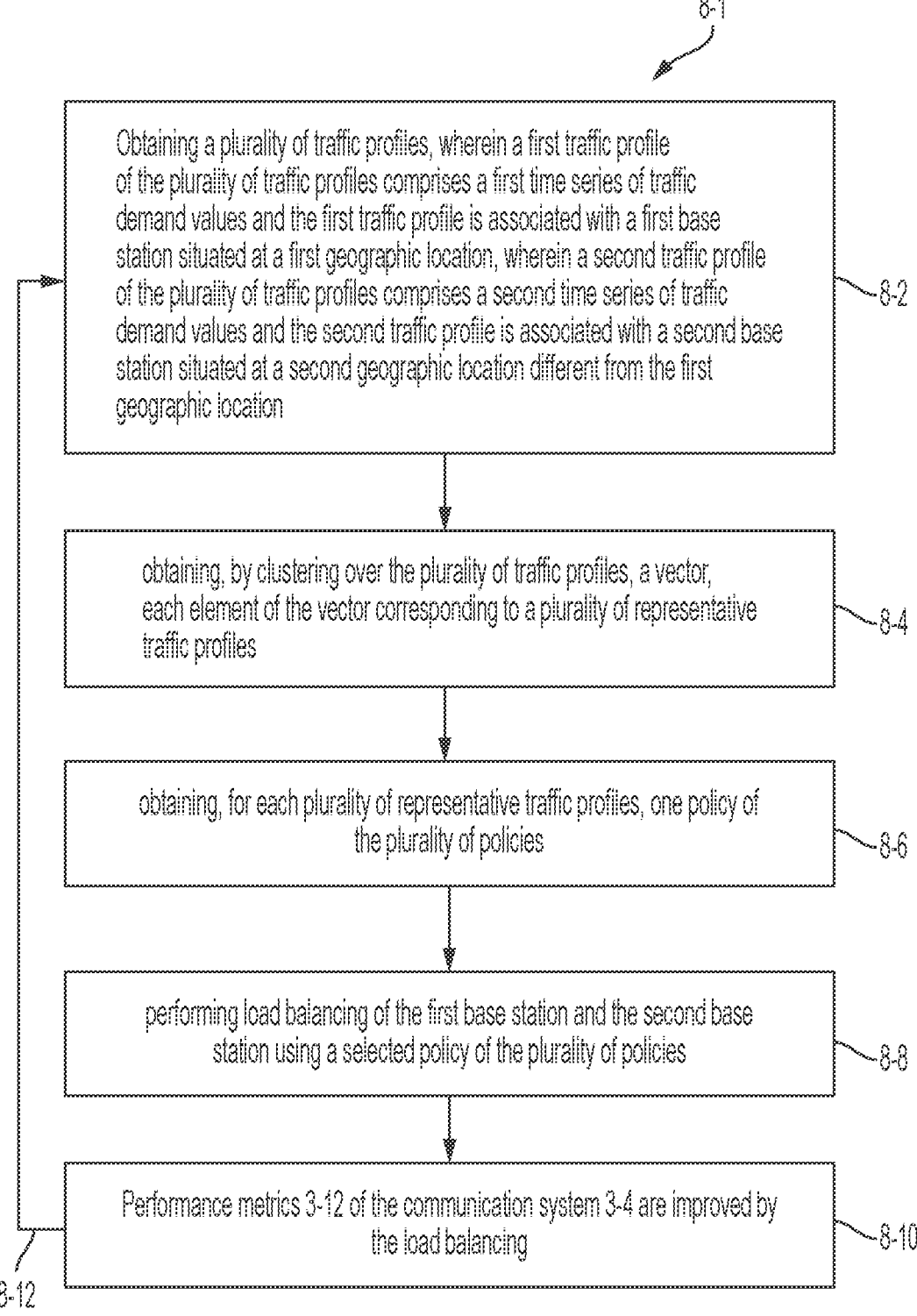

8-1

Obtaining a plurality of traffic profiles, wherein a first traffic profile of the plurality of traffic profiles comprises a first time series of traffic demand values and the first traffic profile is associated with a first base station situated at a first geographic location, wherein a second traffic profile of the plurality of traffic profiles comprises a second time series of traffic demand values and the second traffic profile is associated with a second base station situated at a second geographic location different from the first geographic location    8-2 obtaining, by clustering over the plurality of traffic profiles, a vector, each element of the vector corresponding to a plurality of representative traffic profiles    8-4 obtaining, for each plurality of representative traffic profiles, one policy of the plurality of policies    8-6 performing load balancing of the first base station and the second base station using a selected policy of the plurality of policies    8-8

Performance metrics 3-12 of the communication system 3-4 are improved by the load balancing    8-10

SYSTEM AND METHOD FOR COMMUNICATION LOAD BALANCING IN UNSEEN TRAFFIC SCENARIOS

CROSS REFERENCE TO RELATED APPLICATION

This application claims benefit of priority of U.S. Provisional Application No. 63/227,951 filed Jul. 30, 2021, the contents of which are hereby incorporated by reference.

FIELD

The present disclosure is related to obtaining a policy, for load balancing a communication system, from previous policies.

BACKGROUND

The present application relates to support of cellular communications particularly with respect to supporting traffic volume (or traffic for short) efficiently with a deployment of base stations. An example of cellular communications is 5G.

SUMMARY

A problem occurs in a radio communication system when a base station (BS) has a poor configuration with respect to present traffic demand. The base station may not be able to provide enough spectral bandwidth requested from user equipment devices (UEs). Or, a base station may be inefficiently allocated more spectrum than necessary to meet demand.

An embodiment may address these problems by using a policy bank to provide a policy for choosing load balancing parameters for a network characterized by previously unseen scenario, where a scenario is a description of a network layout and traffic demand statistics.

Communication load balancing balances the communication load between different network resources, e.g., frequencies. Load balancing improves the quality of service of the communications systems. For example, efficient load balancing improves the system's total IP throughput and minimum IP throughput of all frequencies.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

FIG. 4B illustrates an algorithm for determining a policy, according to some embodiments.

FIG. 4C illustrates an algorithm for training a policy selector, according to some embodiments.

FIG. 8 illustrates an example in which clustering is used to determine the scenarios, according to some embodiments.

DETAILED DESCRIPTION

Embodiments provide a reduction in required minimum computational power and a reduction in required computer memory at a network server 5-8. These computational hardware improvements are provided by the embodiments performed by the policy selection server 3-2 disclosed below. The policy selection server 3-2 efficiently selects a policy to be implemented by the network server 5-8 in balancing load in a communication system 3-4 described below. The balanced load is in terms of camping UEs 5-2 and active UEs 5-4. By balancing the load, fewer base stations are needed in the communication 3-4 to provide support for a demanded amount of traffic service at a given performance level (bit error rate, dropped call rate, waiting time to be provided a channel).

Figure 1:
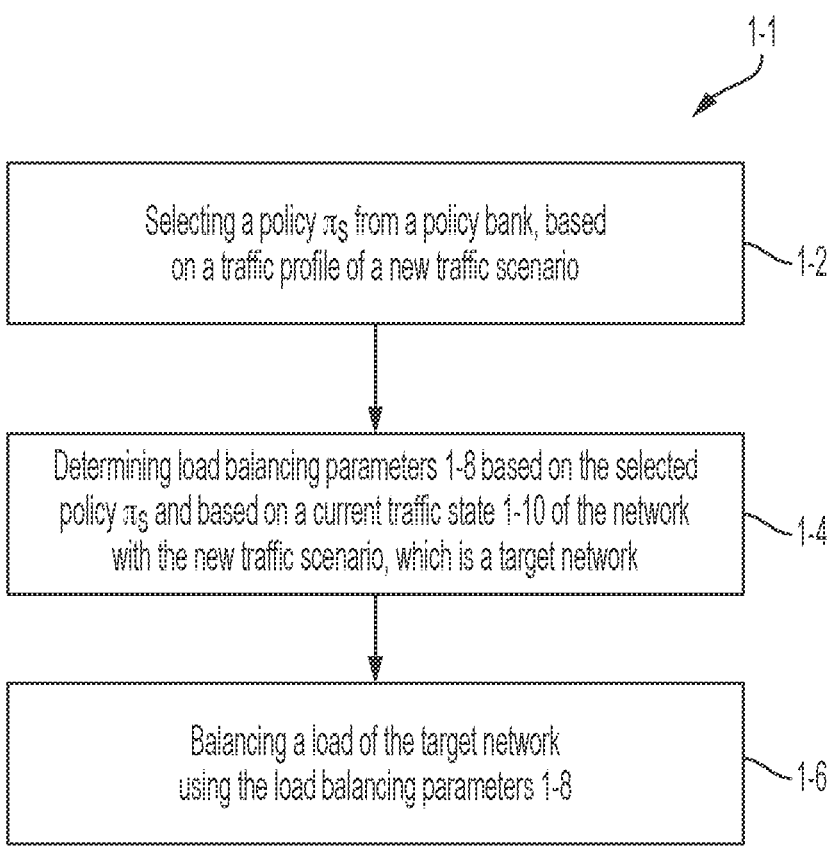
FIG. 1 illustrates a logic flow for selecting a policy from a policy bank and balancing a load of a target network, according to some embodiments.

FIG. 1 illustrates logic 1-1 for balancing the load of the communication system 3-4. At operation 1-2, a policy $\pi_s$ is selected from a policy bank 2-8 based on a traffic profile of the communication system 3-4, which exhibits a previously unseen traffic scenario. The previously unseen traffic scenario may also be referred to as a new traffic scenario. The selection is performed by a policy selector 2-10.

At operation 1-4, load balancing parameters 1-8 for the communication system 3-4 are determined based on policy $\pi_s$.

At operation 1-6, the load of the communication system 3-4, which is a target network, is balanced using the load balancing parameters 1-8.

Figure 2:
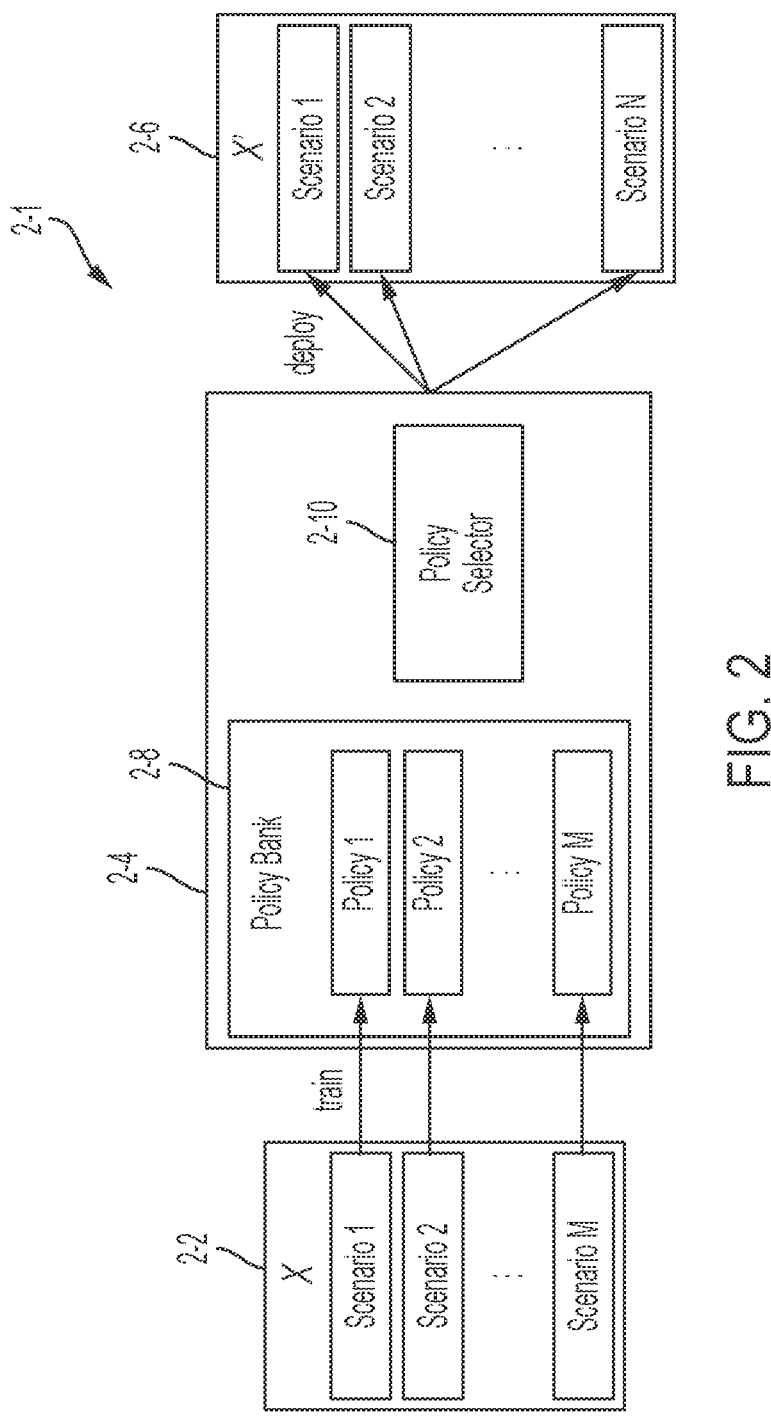
FIG. 2 illustrates forming a policy bank and deploying a selected policy, according to some embodiments.

FIG. 2 illustrates a system 2-1 including input data in the form of scenarios 2-2. The scenarios 2-2 are used to train policies $\pi$ of the policy bank 2-8. A policy selector 2-10, also referred to as a function $f$, selects the policy $\pi_s$ to be deployed for a given target network among several target networks 2-6. The policy bank 2-8 and policy selector 2-10 may be realized by a computer apparatus 2-4 including memory, a hardware processor and software. The computer apparatus 2-4 may be, for example, a policy selection server 3-2.

Figure 3:
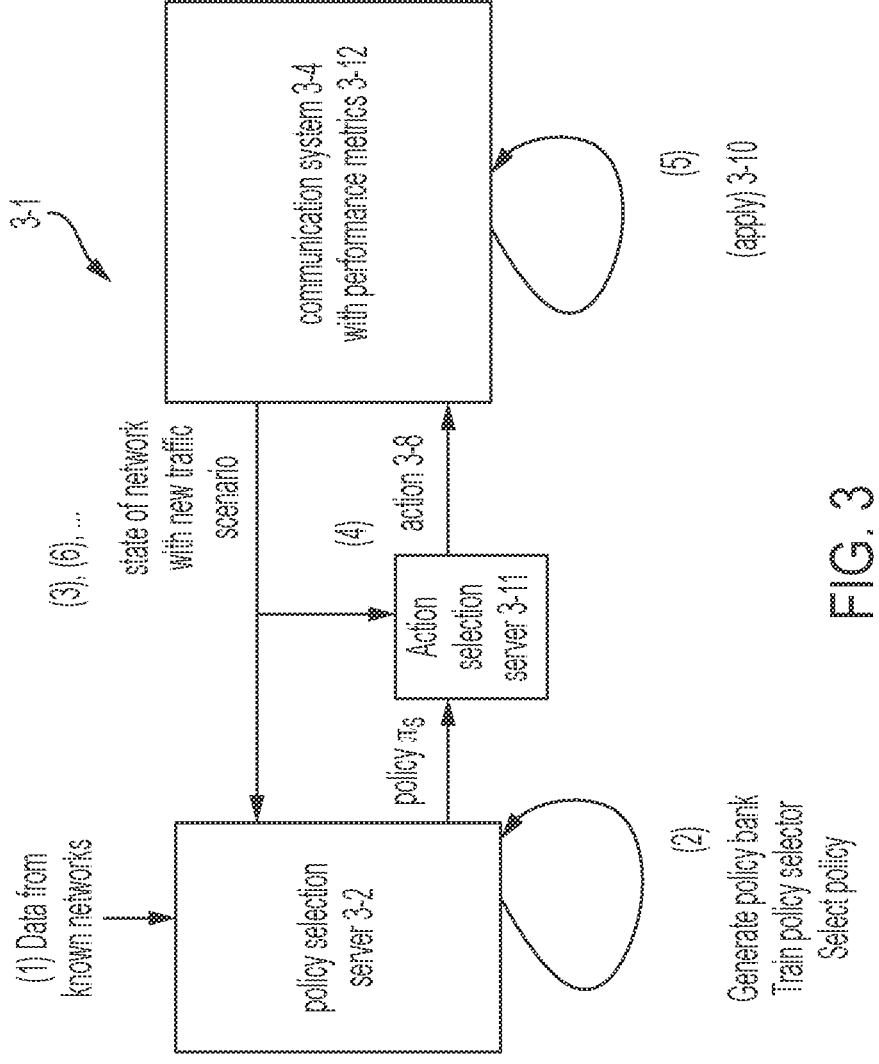
FIG. 3 illustrates a policy selection server working with a communication system, according to some embodiments.

FIG. 3 illustrates a system 3-1 including the policy selection server 3-2, an action selection server 3-11 and the communication system 3-4.

At time (1) data from known networks is obtained and the policy bank 2-8 is trained and the policy selector 2-10 is trained.

At time (2), a system set of parameters 3-6 is obtained from the communication system 3-4. The system set of parameters 3-6 is an example of current traffic state. At time (3), the policy selection server 3-2 selects a policy $\pi_s$ based on data from the previously unseen traffic scenario (new traffic scenario) of communication system 3-4.

At time (4), the action selection server 3-11 takes action 3-8 based on the policy $\pi_s$. The action 3-8 includes providing the load balancing parameters 1-8 (including updated reselection parameters 10-12 and updated handover parameters 10-14) for use in the cells 5-6 of the communication system 3-4. The action 3-8 is an example of a first action.

At time (5), the communication system 3-4 applies the updated reselection parameters 10-12 and updated handover parameters 10-14 and performance metrics 3-12 are achieved because the load of the target network has been balanced. The performance metrics 3-12 reflect a first reward obtained by moving, based on the first action, from a first state of the communication system 3-4 to a second state.

An some embodiments of FIG. 3, referring to time (1), the receiving data from known networks includes obtaining a plurality of traffic profiles, wherein a first traffic profile of the plurality of traffic profiles comprises a first time series of traffic demand values and the first traffic profile is associated with a first base station situated at a first geographic location, wherein a second traffic profile of the plurality of traffic profiles comprises a second time series of traffic demand values and the second traffic profile is associated with a second base station situated at a second geographic location different from the first geographic location.

Additionally, in some embodiments of FIG. 3, referring to time (2), the generating the policy bank includes obtaining, by clustering over the plurality of traffic profiles, a vector, each element of the vector corresponding to a plurality of representative traffic profiles. The representative traffic profiles are, in some embodiments, scenario 1, . . . , scenario M (or scenario N) (also referred to generally as $\chi$ of 7-2 in FIG. 7 with indices 1 . . . M, or referred to as D' in Table 2 with indices 1 to N). Generating the policy bank 2-8 includes obtaining, for each plurality of representative traffic profiles, one policy of the plurality of policies making up the policy bank 2-8. An example of training a policy is given in FIG. 4B.

A policy $\pi_s$ is then selected by the policy selector 2-10. Load balancing parameters 1-8 are determined as an action 3-8 based on the state of the network with the unseen scenario. Then, among other load balancing events and referring to time (4) of FIG. 3, the balancing the load of the target network using the plurality of policies includes performing load balancing of the first base station and the second base station using the first policy of the plurality of policies.

In some embodiments, and again referring to time (1), the data from known networks includes a plurality of traffic profiles. In an example, a first traffic profile of the plurality of traffic profiles is a time series of traffic demand values and the first traffic profile is associated with a first channel of a first base station situated at a first geographic location of a known network of the known networks.

In some embodiments and referring to time (2) of FIG. 3, training the policy selector 2-10 includes running the plurality of policies in the policy bank 2-8 on the plurality of traffic profiles and obtaining a plurality of state representations.

One cluster of the plurality of profiles is associated with one Markov decision process (MDP). MDP is discussed in detail below.

Each state representation includes a plurality of state vectors corresponding to a traffic profile and a policy. The plurality of state representations are a training set. The policy selector 2-10 is trained based on the training set. Further details of training the policy selector 2-10 are given in FIG. 4C.

Referring to times (1) and (2), receiving the state of the communication system 3-4, a state which represents an unseen scenario, is an example of deploying the plurality of policies of the policy bank 2-8 and the policy selector 2-10 to the target network (communication system 3-4), see the event of "deploy" from 2-10 to 2-6 in FIG. 2. The target network exhibits traffic profiles not identical to the plurality of traffic profiles obtained at time (1) from the known networks. At times (3) and (4), as discussed above, balancing the load of the target network using the plurality of policies of the policy bank 2-8 then occurs in the form of using the policy $\pi_s$ selected by the policy selector 2-10 at time (2).

Figure 4A:
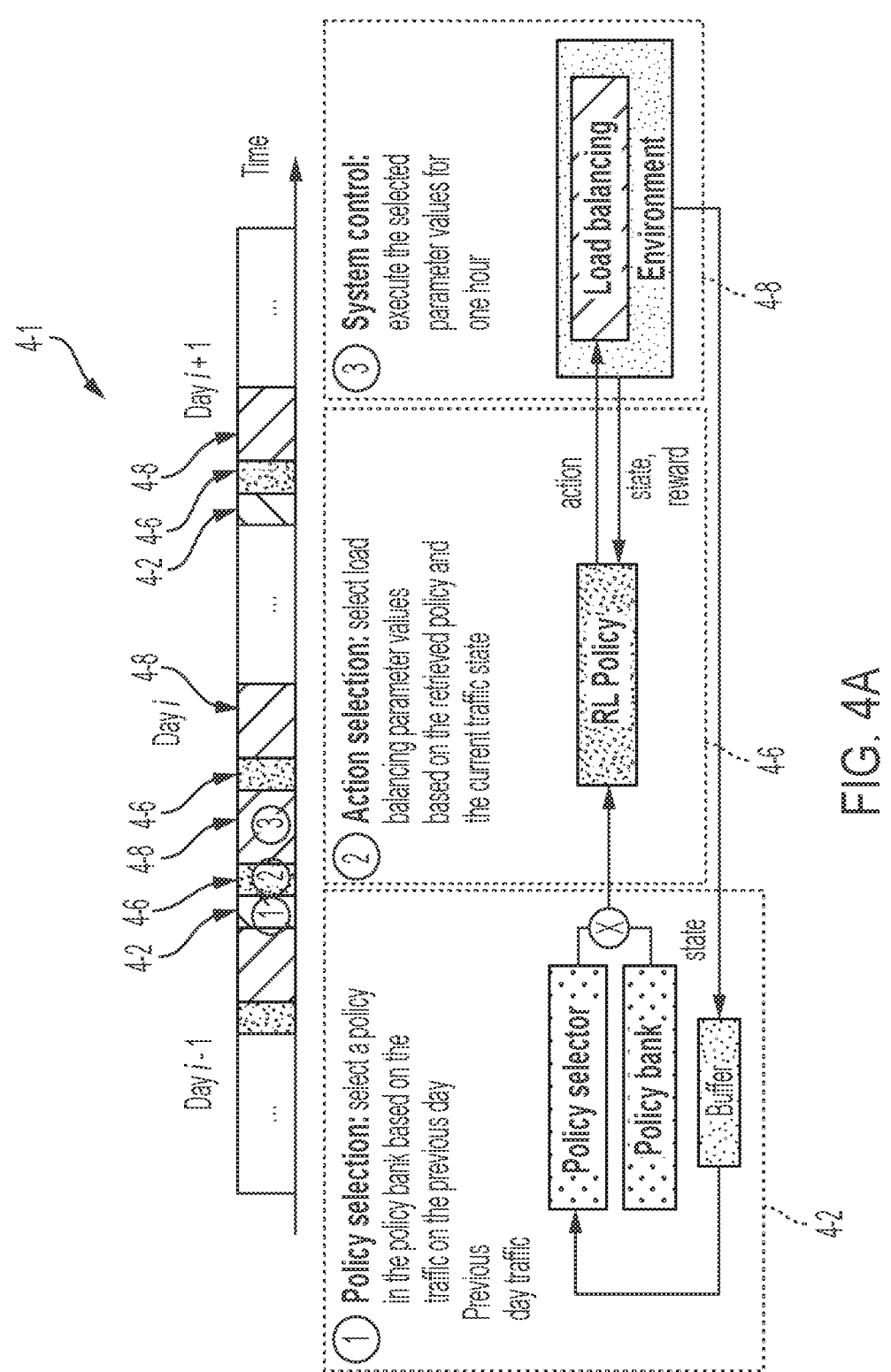
FIG. 4A illustrates policy selection, action selection and system control, according to some embodiments.
Figure 5:
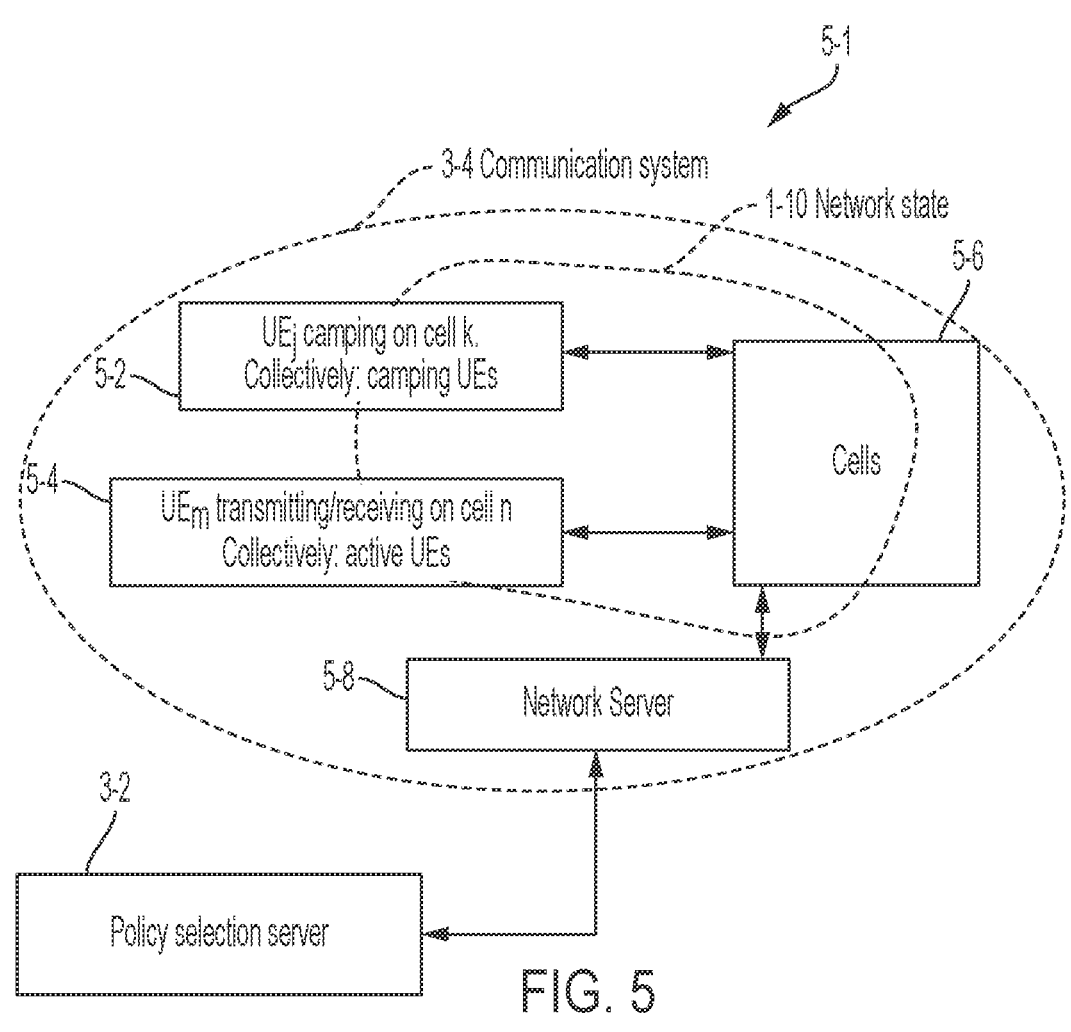
FIG. 5 illustrates an example communication system, according to some embodiments.

FIG. 4A illustrates an exemplary embodiment illustrating an operation (1) of policy selection, indicated by reference number 4-2 (performed by, for example, policy selection server 3-2 of FIG. 3), an operation of (2) of action selection, indicated by reference number 4-6 (performed by, for example action selection server 3-11 or network server 5-8 of FIG. 5). Operation (2) outputs the action using the selected policy based on the current traffic data. Also, an operation (3) of system control is shown in FIG. 4A and is indicated by reference number 4-8 (performed by, for example, network server 5-8 of FIG. 5). Operation (3) also includes applying the action 3-8 in the communication system 3-4 to improve performance metrics 3-12.

At the top of FIG. 4, a day i−1, a day i and a day i+1 are indicated with a time axis.

During day i, operation (1) occurs a single time, followed by alternating occurrences of operations (2) and (3).

Load balancing occurs in a given environment. An environment is a configuration of base stations and a pattern of traffic demands made on the base stations, which are also referred to as traffic patterns.

While communication system 3-4 is operating, observed traffic patterns are stored in a buffer as shown in FIG. 4. Formally, the stored data is a trajectory $\tau$ where each point in the trajectory is a tuple of the form $(s_k, a_k, r_k)$ where k indexes time (the $k^{th}$ time step). The trajectory may thus be expressed as $T=\{(s_0, a_0, r_0), (s_T, a_T, r_T)\}$. Thus a trajectory is a sequence of state, action and reward obtained by running some policy $\pi$ on an environment E for T consecutive time steps. The environment E is defined by a geographical placement of base stations, resource allocation in terms of bandwidth, and a set of statistics indicating traffic demand for a geographical distribution of camping UEs and a geographical distribution of active UEs.

A state $s_t$ is a communication network state at a time step t. The state indicates a number of active UEs, the number of camping UEs, the data throughput (also referred to as IP throughput), and the resources usage (for example the number of physical resource blocks, PRBs) of each cell of the communication network 3-4. A current state of the network may be referred to as network state 1-10.

A baseline policy $\pi_0$ is a policy not obtained by reinforcement learning (RL) and is for example, a rule-based policy. A rule-based policy sets reselection parameters 10-12 and handover parameters 10-14 to some predetermined values without training the parameters based on traffic experiences. For example, a rule-based policy may set the parameters based on expert knowledge.

A set of policies (elements of the policy bank 2-8) may be trained using Algorithm 1 as provided in Table 1.

TABLE 1

| Obtaining N policies for N network scenarios. | |
| --- | --- |
| Item | Description |
| 1 | Input: D = {D₁, D₂, ... , D_N} where D_i is the traffic data from a network node i or from a representative traffic profile obtained by clustering, for a given environment E_i |
| 2 | Output: RL policy bank Π = {π₁, π₂, ... , π_N} |
| 3 | Begin |
| 4 | For i = 1 to N do |
| 5 | set the simulation environment E_i according to D_i |
| 6 | operate on E_i, find the policy π_i |
| 7 | End |

For item 6 of Table 1, a proximal policy optimization (PPO) algorithm may be used to operate on $E_i$ to find $\pi_i$. PPO is a non-limiting example, and other reinforcement learning algorithms can be used.

FIG. 4B illustrates an algorithm for determining a policy, according to some embodiments. In Algorithm 2 of FIG. 4B, the value function $\phi$ evolves over Ne batches of Nt trajectories. The policy may be implemented as a neural network. The parameters of the network are represented as the variable $\theta$. The value function is $v_\phi$, which can be implemented by a neural network. The parameters of the value function, $\phi$, are updated at each iteration.

A policy is initialized as $\pi_{\theta_0}$.

For each set of trajectories, D, an advantage estimate $\hat{A}$ is computed using a function $v_\phi$.

The advantage estimate is used to find a next iteration of $\theta_i$.

The value function is then updated based on $v_\phi$ and the rewards observed up to time T.

For further details of implementation of a proximal policy optimization, see J. Schulman, et al., "Proximal Policy Optimization Algorithms," Aug. 27, 2017, Cornell Archive paper number arXiv:1707.06347v2.

FIG. 4C illustrates an algorithm for training a policy selector, according to some embodiments.

In FIG. 4C, a sliding window algorithm is used. That is, a sliding window identifies input data to be used in the training of the policy selector f. For example, in one embodiment, T=168 and K=24 so for each data sequence of length, 168, the sliding window algorithm creates 145 sub-sequences of length 24.

FIGS. 5-11 provide further description of the application of the algorithms described in Table 1 and FIGS. 4A, 4B and 4C.

FIG. 5 illustrates the communication system 3-4 and the policy selection server 3-2. In general there are many communication systems providing trajectories τ which make up data sets D used in the algorithms of Table 1 and FIGS. 4A, 4B and C. In FIG. 5, the communication system 3-4 is a target network which is going to benefit from the policy $\pi_s$ chosen by policy selector 2-10 from policy bank 2-8.

Figure 6:
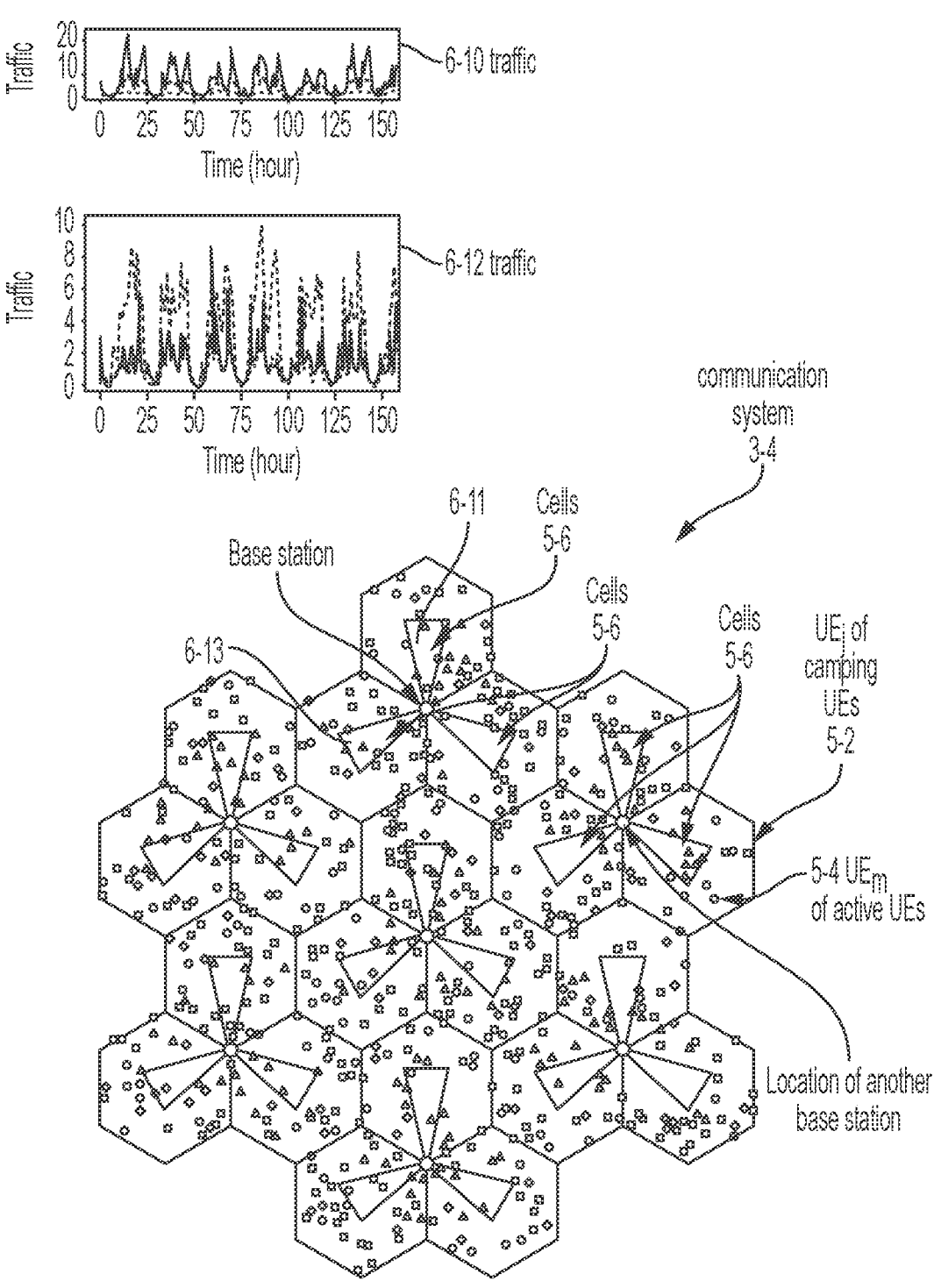
FIG. 6 illustrates a communication system, according to some embodiments.

The communication system 3-4 includes cells 5-6 (also see FIG. 6). Being served by the cells 5-6 are active UEs 5-4 including $UE_m$. Also present in the communication system 3-4 are camping UEs 5-2 including $UE_j$.

The policy selection server 3-2 determines a policy by using Algorithms 1, 2 and 3 and providing the input data as shown in FIG. 4A to be acted on by the policy selector 2-10.

The network server 5-8 performs the function of the action selection server 3-11 and also applies the policy based on the network state 1-10 to obtain load balancing parameters 1-8 which includes updated reselection parameters 10-12 and updated handover parameters 10-4. Action selection applies the policy $\pi_s$ based on the network state to obtain load balancing parameters (for example, updated reselection parameters 10-12 and updated handover parameters 10-4).

FIG. 6 illustrates communication system 3-4 including cells 5-6, camping UEs 5-2 and active UEs 5-4. Also shown are example traffic 6-10 of a cell 6-11 and traffic 6-12 of a cell 6-13.

The geographic layout and bandwidth allocation of the communication system 3-4 along with the statistics of traffic demand from the camping UEs 5-2 and active UEs 5-4 represent a scenario. For a scenario, the statistics are stationary. Examples of a scenario include an urban cell layout on a weekday, an urban cell layout on a weekend day, a rural cell layout on a weekday, or an rural cell layout on a weekend day.

Load balancing includes redistributing user equipment (UEs) between cells. A cell is a service entity serving UEs on a certain carrier frequency and within a certain direction range relative to the base station it resides on. A base station can host multiple cells serving at different non-overlapping direction ranges (or sectors). Load balancing can be triggered between cells in the same (or different) sector(s).

The UEs have two states: active and idle. A UE is active when it is actively requesting network resources. For example, such a user might be streaming videos or making a call. When an UE is not in such a state, it is idle. There are two types of load balancing methods: (1) active UE load balancing (AULB) which is done through handover, and (2) idle UE load balancing (IULB) which is done through cell-reselection. The first one results in instantaneous changes in the load distribution with the cost of system overheads. The second one is relatively more lightweight and it affects the load distribution when UEs change from idle to active.

Active UE load balancing (AULB): AULB, such as mobility load balancing moves, by handover, active UEs from their serving cells to neighboring cells if better signal quality can be reached.

A handover occurs if Eq. 1 is true.

$$F_j > F_i + \alpha_{i,j} + H \qquad \text{Eq. (1)}$$

H is the handover hysteresis and $a_{i,j}$ is a control parameter, such as the Cell Individual Offset (CIO). Equation 1 shows that by decreasing $a_{i,j}$, the system can more easily handover UEs from cell i to cell j, thereby offloading from i to j, and vise-versa. Therefore, finding the best $a_{i,j}$ value suitable for different combinations of traffic status at cells i and j can allow us to perform AULB optimally.

2) Idle UE load balancing (IULB): IULB moves idle UEs from their camped cell to a neighboring cell based on cell—reselection. From the cell it is camped on, an idle UE can receive minimal service, such as broadcast service. Once it turns into active mode, it stays at the cell it camped on, and can be moved to another cell through AULB.

Generally, cell-reselection is triggered when the following $$F_i < \beta_{i,j} \text{ and } F_j > \gamma_{i,j} \qquad \text{Eq. (2)}$$

where $\beta_{i,j}$ and $\gamma_{i,j}$ are control parameters. By increasing $\beta_{i,j}$ and decreasing $\gamma_{i,j}$, the system can more easily move idle UEs from cell i to cell j, and vice-versa. Hence, optimally controlling these parameters will allow the system to balance the anticipated load and reduce congestion when idle UEs become active.

3) Performance metrics: Let C be the group of cells on which the system uses to balance the load. To achieve this goal and to ensure that the system enhances the overall performance of the network, four throughput-based system metrics are considered.

$G_{avg}$ describes the average throughput over all cells in C, defined in Eq. (3).

$$G_{avg} = \left(\frac{1}{|C|}\right) \sum_{c \in C} \frac{A_C}{\Delta t} \qquad \text{Eq. (3)}$$

where $\Delta t$ is the time interval length and $A_c$ is the total throughput of cell c during that time interval. Maximizing $G_{avg}$ means increasing the overall performance of the cells in C.

$G_{min}$ is the minimum throughput among all cells in C, see Eq. (4).

$$G_{min} = \min_{c \in C} \frac{A_C}{\Delta t} \qquad \text{Eq. (4)}$$

Maximizing $G_{min}$ improves the worst-case cell performance.

$G_{sd}$ is the standard deviation of the throughput, see Eq. (5)

$$G_{sd} = (1/|C|) \sum_{c \in C} \left(\frac{A_C}{\Delta t} - G_{avg}\right)^{2} \Big)^{0.5} \qquad \text{Eq. (5)}$$

Minimizing $G_{sd}$ reduces the performance gap between the cells, allowing them to provide more fair services.

$G_{cong}$ quantifies the ratio of uncongested cells, see Eq. (6).

$$G_{cong} = \left(\frac{1}{|C|}\right) \sum_{c \in C} 1\left(\frac{A_C}{\Delta t} > \epsilon\right) \qquad \text{Eq. (6)}$$

where $1(\cdot)$ is the indicator function returning 1 if the argument is true, otherwise 0 and $\epsilon$ is a small value. Maximizing $G_{cong}$ discourages cells getting into a congested state. An example of $\epsilon$ is 1 Mbps.

Sequential decision-making is an important problem in the field of machine learning. It covers a wide range of applications such as telecommunication, finance, self—driving cars etc. In short, sequential decision-making describes the task where given some past experience, an intelligent agent is expected to make a decision in an uncertain environment in order to achieve the given objective.

A formal framework known as reinforcement learning (RL) for sequential decision making. The core idea of RL is that by mimicking a biological agent, the artificial agent can learn from its past experience by optimizing some objectives given in the form of cumulative rewards. Formally speaking, a general RL problem is a discrete—time stochastic control process. In this framework, a common assumption is that the control process follows Markov property, that is, the future of the process only depends on the current state.

The solution to an RL problem (policy) is a function 7 which maps from S to A. To obtain this solution, the agent needs to achieve the maximum expected cumulative rewards.

There are two main types of approaches, one is the value-based method, the other is the policy gradient-based method. The value-based method focuses on building a value function or an action-value function, i.e. an estimation of the accumulated rewards and then generate a policy based on the estimated value function by taking the argmax over the action space. Some significant work includes Q learning, Q learning with function approximator and, deep Q networks (DQN). The policy gradient method leverages a function approximator (e.g. neural networks) to model the policy and directly optimizes the policy with respect to a performance objective (typically the expected cumulative reward).

One heuristic found in training policy networks (i.e. neural networks parameterized policy) is that if the parameter updates change the policy too much at one step, it is often detrimental to the training process, which is known as policy collapse. By enforcing a KL divergence constraint between each update, trust region policy optimization (TRPO) successfully adopts this idea and guarantees a monotonic improvement over policy iteration. However, TRPO is often criticized for its complex structure and its incompatibility with some common deep learning structures. To alleviate this problem, a clipped surrogate objective is introduced in the proximal policy optimization (PPO) method. The proposed method only requires first-order optimization and can still retain similar performance compared to TRPO. The method is much simpler to implement, and more importantly, it has better sample complexity compared to TRPO, which is of great importance when it comes to real-world application. Some drawbacks of the PPO framework are stability issues over the continuous action domain and proposed some simple workarounds to resolve these problems. Embodiments use PPO as an example RL algorithm as it reduces the risk of policy collapse and provides a more stable learning.

$$L(\theta) = \hat{E}_t(r_t(\theta)\hat{A}_t) \qquad \text{Eq. (7)}$$

where $\hat{A}_t$ is an estimator of the advantage function at timestep t. The expression does not have the KL constraint proposed in TRPO. Maximizing L will lead to an excessively large policy update. The PPO may be clipped to a small interval near 1 as follows.

$$L^{CLIP}(\theta) = \hat{E}_t[\min(r_t(\theta)\hat{A}_t, \text{clip}(r_t(\theta), 1-\epsilon, 1+\epsilon)\hat{A}_t)] \qquad \text{Eq. (8)}$$

At each time step t, an action $a_t$, containing new balancing parameter values, is chosen according to the network state $s_t$. After applying $a_t$, the network will transition from $s_t$ to $s_{t+1}$ according to the dynamics of the network captured by a transition probability function P $(s_{t+1}|s_t, a_t)$. The MDP is defined as a tuple $\langle S, A, R, P, \mu \rangle$ as follows:

S is the state space, where each state is a high-dimensional vector of network status information in the last k time steps, describing the recent traffic pattern. The network status information contains the number of active UEs in every cell, the bandwidth utilization of every cell, and the average throughput of every cell. These features are averaged over the time interval between each application of a new action. In an example, each time step is one hour and k=3.

"A" is the action space in which each action is a concatenation of the load balancing parameters $\alpha_{i,j}$, $\beta_{i,j}$ and $\gamma_{i,j}$ for all i,j∈ C.

R is the reward which is a weighted average of the performance metrics of Eq. (1)-Eq. (6). R can be directly computed with the state, the reward is an observed outcome of the chosen action.

P is the transition probability function between states, P $(s_{t+1}|s_t, a_t)$.

μ is the initial distribution over all states in S, $\mu=P(s_0)$.

While S, A and R are the same for all scenarios, P and μ are in general for different scenarios. As an RL policy is trained to maximize the long term reward, it will inevitably be biased by P and μ, therefore a policy trained on one scenario may not be optimal on another.

One of the main challenges for load balancing with a data—driven solution is the generalization of the learning to diverse communication traffic patterns. To ensure that the policy bank can cover a wide range of traffic conditions, traffic scenarios may be clustered based on their daily traffic patterns to discover different traffic types. For this step, the daily traffic pattern is described as a sequence of states over, for example, 24 hours and K-Means is used to perform the clustering. The, a subset of scenarios is randomly picked from each type to form the set of M traffic scenarios. Then PPO is applied using the MDP formulation on each scenario to obtain policy $\pi_i \in \Pi$. The policies are learned by maximizing the expected sum of discounted reward:

$$\pi_i = \text{argmax}_\pi E_\pi\left(\sum_{t=1}^n \lambda^{t-1} R_t\right)$$  Eq. (9)

The policy selector aims to find the traffic scenario that is most similar to the target scenario. The policy $\pi_i$ that is trained on scenario i (also referred to as $X_i$) is chosen to execute in the target scenario. A policy trained on a scenario that is similar to the target scenario results in better performance.

When testing on an unseen traffic scenario, the system feeds in the state description from the last T time steps to the traffic identifier to pick the best policy in the policy bank H. In some embodiments, T=24 hours, allowing the system to capture the peaks and valleys in the regular daily traffic pattern observed in traffic scenario data.

The policy selector, in some embodiments, is a feedforward neural network classifier with 3 hidden layers and 1 output layer.

In some embodiments, each of the first three layers follow a batch normalization. The number of neurons for these layers are 128, 64 and 32, respectively. Some embodiments use rectified linear unit activation for the first three layers and softmax for the last layer. The number of layers, number of neurons for each layer and the activation function are chosen using cross-validation.

An example of a simulation scenario is shown in FIG. 6. FIG. 6 is designed to emulate 4G/5G communication network behaviors, and supports various configurations that customizing the traffic condition. In some embodiments, the number of base stations is fixed to 7, with one base station in the center of the layout. Each base station has 3 sectors, and each sector has 4 cells with different carrier frequencies that are identical across all sectors and base stations.

In an example and to mimic real-world data, a portion of UEs is uniformly concentrated at specified regions while the remaining are uniformly distributed across the environment. These dense traffic locations changes at each hour. All UEs follow a random walk process with an average speed of 3 m/s. The packet arrival follows a Poisson process with variable size between 50 Kb to 2 Mb and inter-arrival time between 10 to 320 ms. Both are specified at each hour to create the desired traffic condition.

Table 2 provides average performance over six days and several algorithms.

TABLE 2 performance of various algorithms ("policy selector" corresponds to embodiments)

| | Reward | $G_{avg}$ | $G_{min}$ | $G_{sd}$ | $G_{cong}$ |
|---|---|---|---|---|---|
| BEST-π | 0.452 | 3.399 | 2.016 | 1.680 | 0.887 |
| NEW-π | 0.456 | 3.365 | 2.057 | 1.631 | 0.889 |
| BasicLB | 0.403 | 3.036 | 1.646 | 2.204 | 0.854 |
| AdaptLB | 0.422 | 3.144 | 1.834 | 1.936 | 0.847 |
| RAND-π | 0.426 | 3.245 | 1.847 | 1.822 | 0.855 |
| Policy selector | 0.446 | 3.355 | 2.010 | 1.692 | 0.867 |

Figure 7:
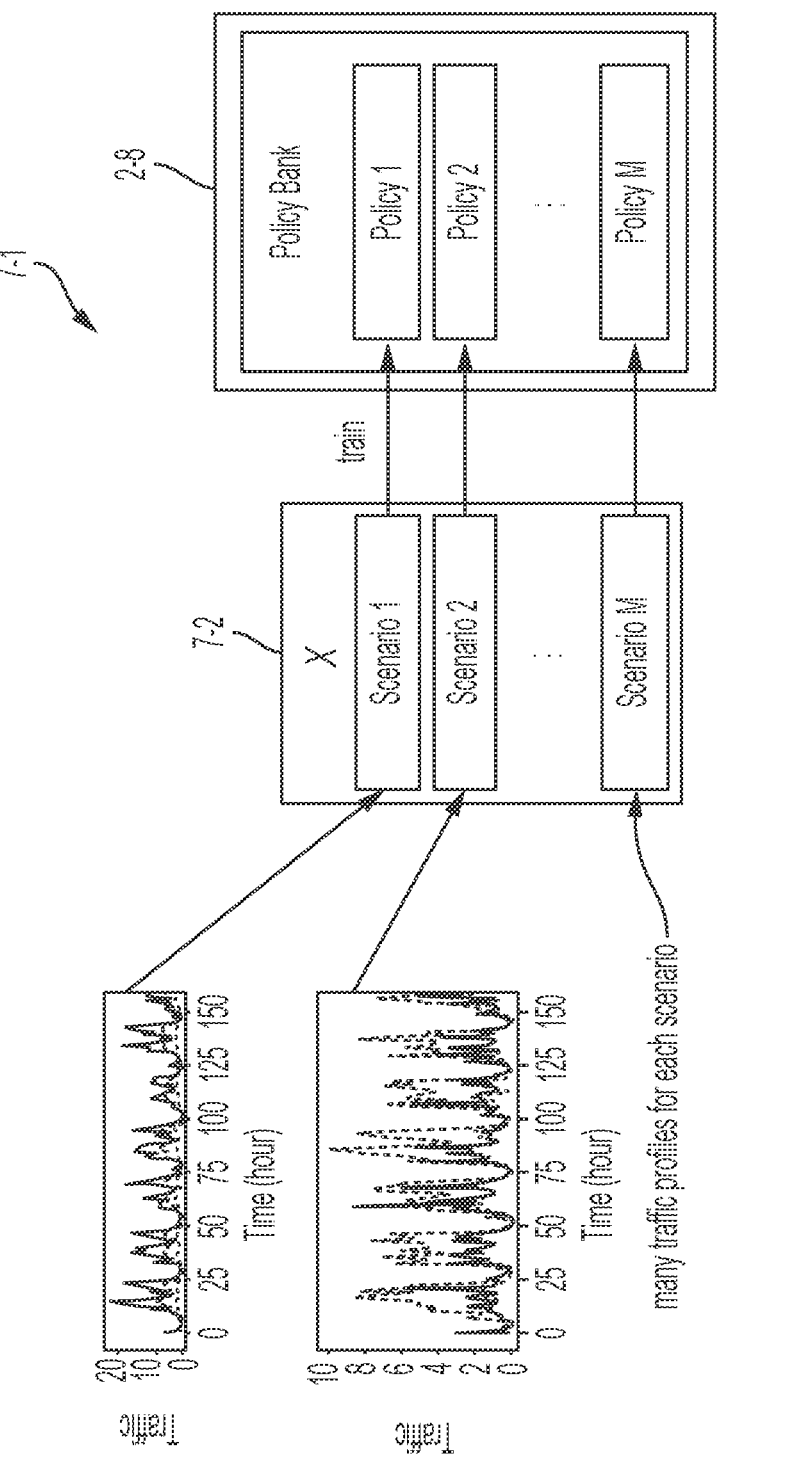
FIG. 7 illustrates an example of training the policies of the policy bank, according to some embodiments.

FIG. 7 illustrates training the policies of the policy bank 2-8. Many traffic profiles are collected for each scenario. For example the number of traffic profiles may represent approximately one month of traffic observed at one cell of one base station. K-means clustering may be used to reduce the number of scenarios, each resulting scenario represented by a representative collection of traffic profiles.

Table 3 provides Algorithm 4 for applying clustering to traffic profiles.

The steps of Table 3, in a non-limiting example, correspond to obtaining a plurality of traffic profiles, wherein a first traffic profile of the plurality of traffic profiles comprises a first time series of traffic demand values and the first traffic profile is associated with a first base station situated at a first geographic location, wherein a second traffic profile of the plurality of traffic profiles comprises a second time series of traffic demand values and the second traffic profile is associated with a second base station situated at a second geographic location different from the first geographic location; obtaining, by clustering over the plurality of traffic profiles, a vector, each element of the vector corresponding to a plurality of representative traffic profiles; and obtaining, for each plurality of representative traffic profiles, one policy of the plurality of policies.

TABLE 3

Algorithm 4, clustering over traffic profiles.

| Item | Description |
|---|---|
| 1 | Input: D = {$D_1$, $D_2$, ... , $D_N$} where $D_i$ is the traffic data from a network node i or from a representative traffic profile obtained by clustering, for a given environment $E_i$. For example, N network nodes and L clusters. |
| 2 | Output: RL policy bank Π = {$\pi_1$, $\pi_2$, ... , $\pi_N$} |
| 3 | Determine number of clusters represented by {$D_1$, $D_2$, ... , $D_N$}; this number is L. |
| 4 | For each cluster, associate the traffic profiles corresponding to the given cluster. |
| 5 | Formulate a vector D', the $i^{th}$ element of the vector D' being the collection of traffic profiles associated with the $i^{th}$ cluster. D' = {$D'_1$, $D'_2$, ... , $D'_L$} |
| 6 | Begin |
| 7 | For i = 1 to L do |
| 8 | set the simulation environment $E_i$ according to $D'_i$ |

TABLE 3-continued

| Algorithm 4, clustering over traffic profiles. | |
| --- | --- |
| Item | Description |
| 9 | operate on $E_i$, find the policy $\pi_i$ |
| 10 | End |

In FIG. 7, item 7-2 represents D if scenarios are based on network nodes and represents D' if scenarios are found as a reduced overall statistical representation based on clustering, for example, using Algorithm 4 of Table 2. D' is also referred to as $\chi$ in the discussion of FIG. 3.

A given policy is trained using, for example, Algorithm 2. The collection of trained policies forms the policy bank 2-8, shown in FIG. 7.

FIG. 8 provides a logical flow for training profiles using clustering, performing load balancing based on a selected policy, and thus improving performance metrics 3-2 of the communication system 3-4.

At operation 8-2, a plurality of traffic profiles is obtained. The plurality of traffic profiles corresponds to $\{D_1, D_2, \ldots, D_N\}$ of Table 1 and of Algorithm 4.

At operation 8-4, clustering is performed.

At operation 8-6 policy training is performed, one policy per cluster.

At operation 8-8, a policy is selected and load balancing is performed. Also see FIG. 4A showing policy selection 4-2, action selection 4-6 and system control 4-8.

Operation 8-10 indicates that performance metrics 3-12 of the communication system 3-4 are improved by the load balancing.

Figure 9:
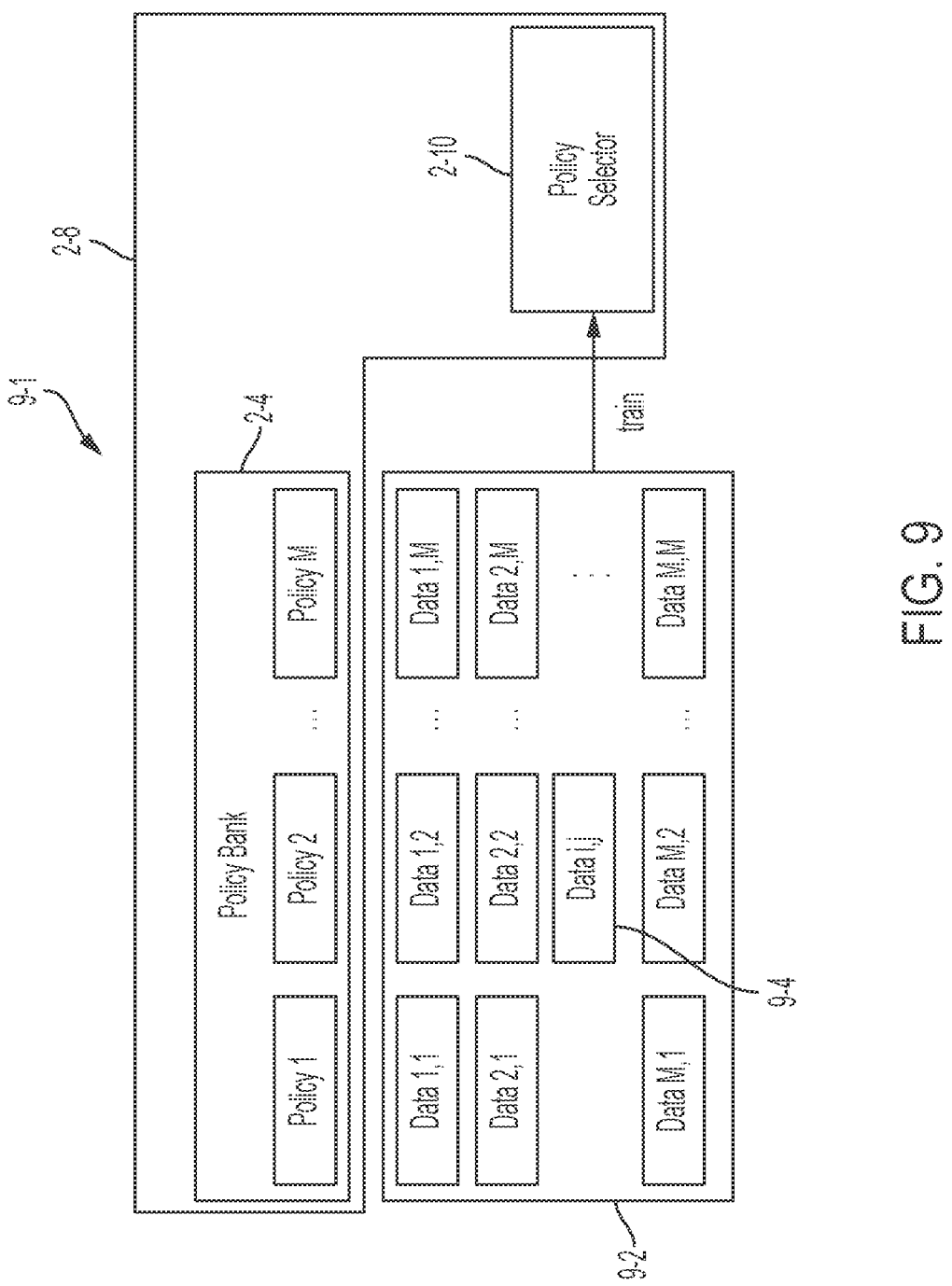
FIG. 9 illustrates training the policy selector, according to some embodiments.

FIG. 9 illustrates training the policy selector 2-10.

Policy j is used to act on scenario i. See the inner loop indexed by t in Algorithm 3, FIG. 4C (network state $s_t$ is obtained by running $\pi_j$ on $E_i$). The resulting trajectories $\tau$, which depend on $s_t$, for each combination of policy j and scenario i provide an element 9-4 called Data i,j of an array 9-2. The array 9-2 is used to train the policy selector 2-10 using Algorithm 3 of FIG. 4C.

Figure 10A:
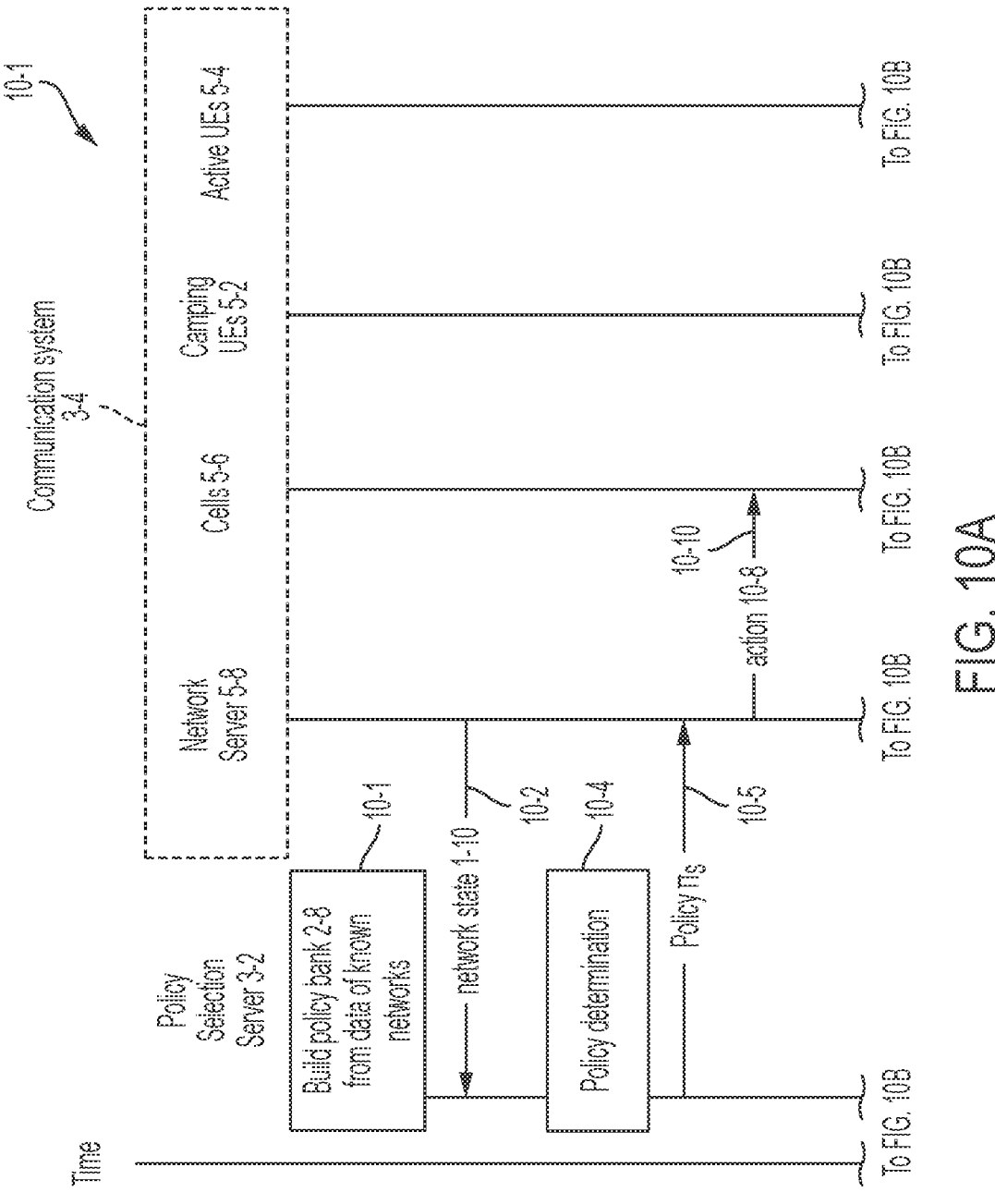
FIGS. 10A and 10B illustrate communication between servers and components of a communication network, according to some embodiments.
Figure 10B:
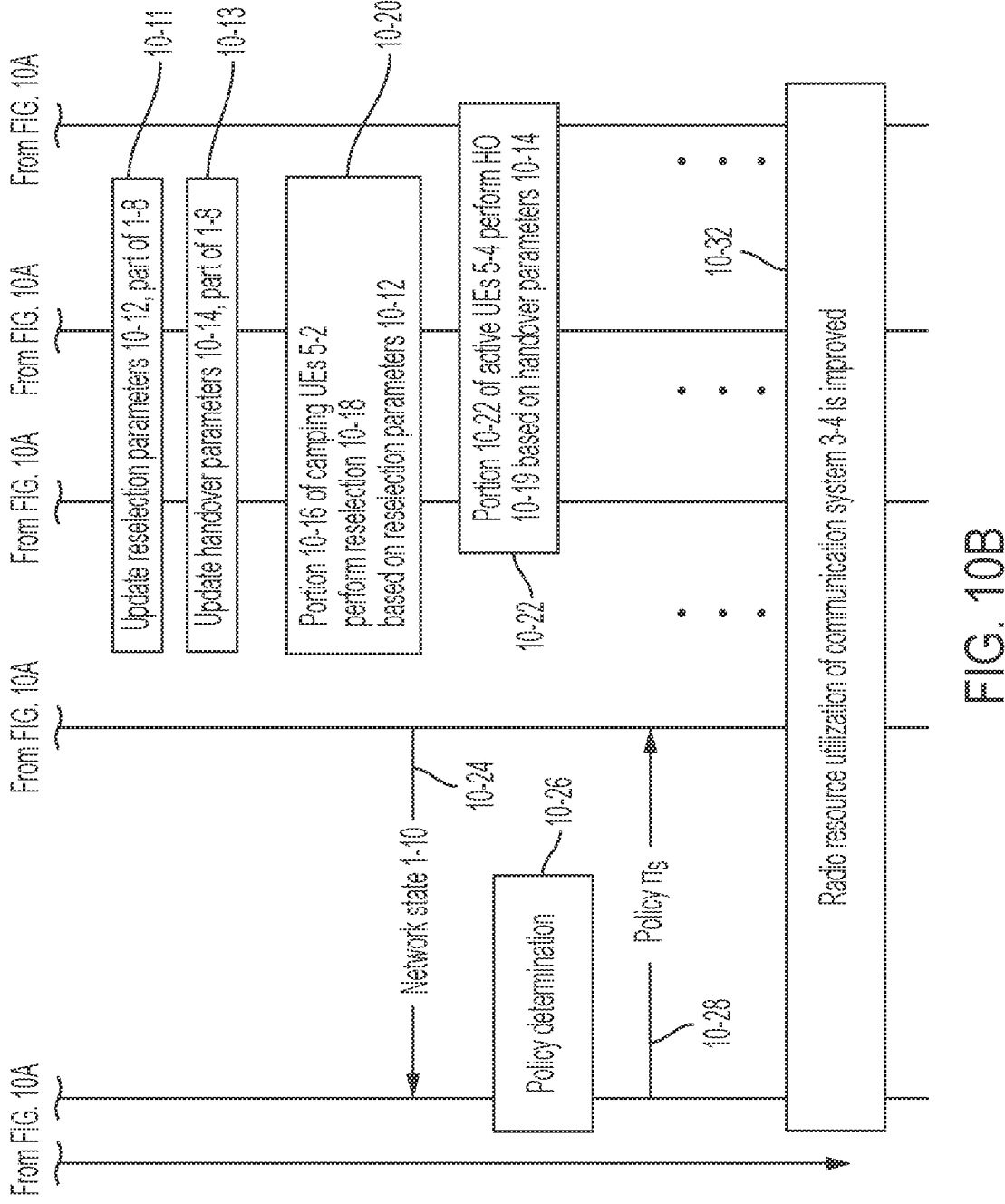

FIGS. 10A and 10B, taken together illustrate a message flow diagram with time advancing from top to bottom. Various entities are illustrated across the top. Actions are listed in boxes. Messages are shown as arrows. Each arrow may represent more than one message in practice. Also, more than one arrow may be achieved by a single message in practice.

At 10-1, the policy selection server 3-2 builds the policy bank 2-8 using data of known networks.

With respect to a previously unseen scenario, communications system 3-4, network state 1-20 is sent by network server 5-8 to the policy selection server 3-2 in a message 10-2. This information is buffered, see FIG. 4A. This is repeated as time passes, see for example, 10-2.

At 10-4, policy determination takes place and a message 10-5 carries an indicator of policy $\pi_s$ to the network server 5-8. Based on network state, the network server 5-8 takes action 10-8 configuring the load balancing parameters 1-8. This will happen several times a day as shown in FIG. 4A, also see 10-26.

At 10-11 and 10-13, reselection parameters 10-12 and handover parameters 10-14 are updated (subsets of the load balancing parameters 1-8) to improve load balancing.

At 10-20 and 10-22 behavior of UEs 5-2 and UEs 5-4, respectively, are influenced by the load balancing parameters 1-8.

Based on network events, another policy may be selected, see 10-28.

As indicated at 10-32, radio resource utilization of the communication system 3-4 is improved by the contributions of the policy selection server 3-2.

Figure 11:
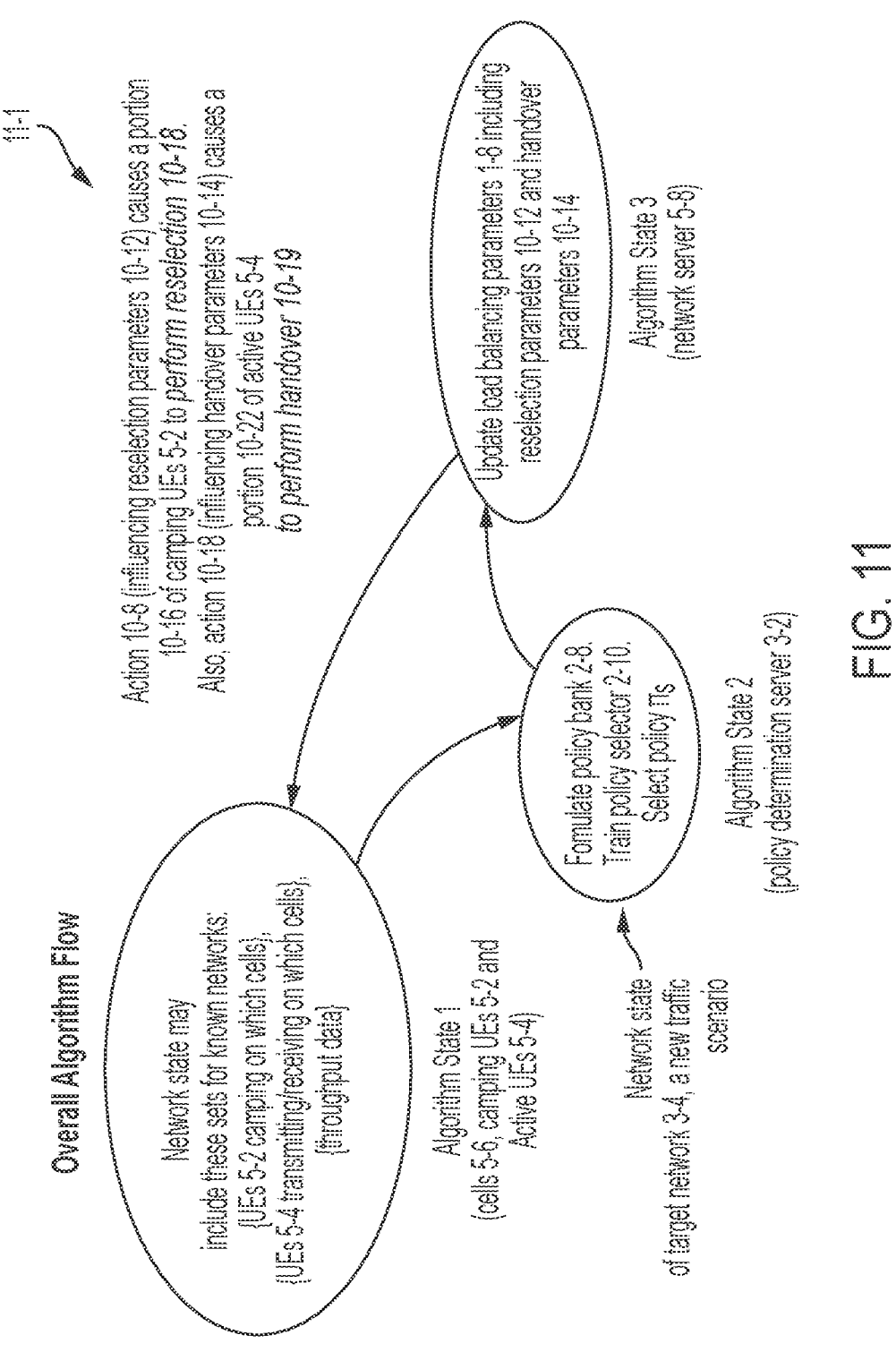
FIG. 11 illustrates an algorithm flow, according to some embodiments.

FIG. 11 illustrates an overview of the overall algorithm flow applied in FIGS. 10A-10B.

At algorithm state 1 of the overall algorithm flow, network state values related to cells 5-6, camping UEs 5-2 and active UEs 5-4 of known networks are obtained.

At algorithm state 2, the policy selection server 3-2 formulates the policy bank 2-8, trains the policy selector 2-10 using data from the known networks. The policy selection server then selects a policy $\pi_s$ for the previously-unseen scenario of the communications system 3-4. The selection is based on the network state of the target network, communications system 3-4. The known networks of algorithm state 1 may be considered to exhibit source traffic profiles. The communications system may be considered to exhibit target traffic profiles. There may be overlap, in a statistical sense, between the source traffic profiles and the target traffic profiles.

At algorithm state 3, network server 5-8 updates the load balancing parameters 1-8 of the target network, communications system 3-4.

Thus, algorithm flow 11-1 balances the communication load between different network resources, e.g., frequencies of target network 3-4. Load balancing improves the quality of service of the camping UEs 5-2 and the active UEs 5-4. For example, efficient load balancing improves the system's total IP throughput and minimum IP throughput of all frequencies.

Figure 12:
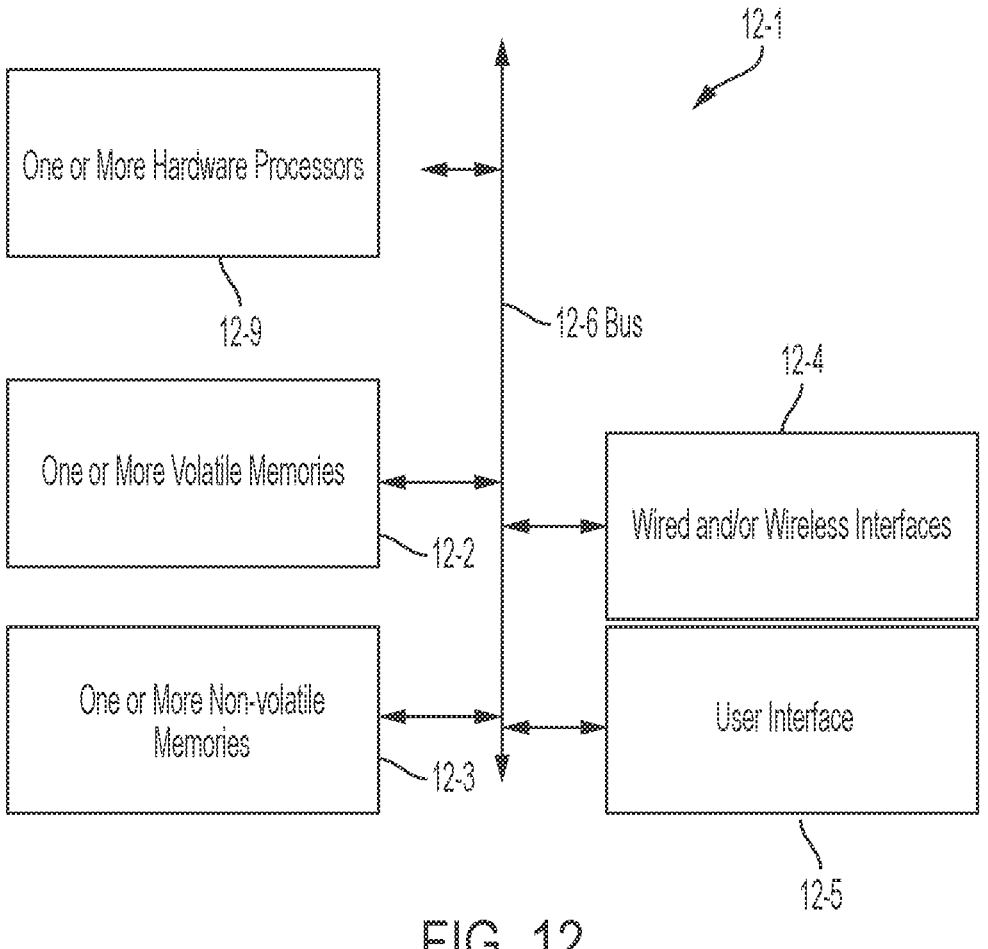
FIG. 12 illustrates exemplary hardware for implementation of computing devices such as the servers 3-2, 5-8, UEs 5-2 and 5-4 and base stations of the communication system 3-4, according to some embodiments.

Hardware for performing embodiments provided herein is now described with respect to FIG. 12.

FIG. 12 illustrates an exemplary apparatus 12-1 for implementation of the embodiments disclosed herein. The apparatus 12-1 may be a server, a computer, a laptop computer, a handheld device, or a tablet computer device, for example. Apparatus 12-1 may include one or more hardware processors 12-9. The one or more hardware processors 12-9 may include an ASIC (application specific integrated circuit), CPU (for example CISC or RISC device), and/or custom hardware. Apparatus 12-1 also may include a user interface 12-5 (for example a display screen and/or keyboard and/or pointing device such as a mouse). Apparatus 12-1 may include one or more volatile memories 12-2 and one or more non-volatile memories 12-3. The one or more non-volatile memories 12-3 may include a non-transitory computer readable medium storing instructions for execution by the one or more hardware processors 12-9 to cause apparatus 12-1 to perform any of the methods of embodiments disclosed herein.

What is claimed is:

1. A method comprising:

selecting a first policy from a policy bank by a policy selector, the policy bank comprising a plurality of policies pre-trained for each of a plurality of traffic profiles, based on a traffic state of a target network;

determining a plurality of load balancing parameters based on the first policy;

balancing, using the plurality of load balancing parameters, a load of the target network for a first period of time;

obtaining a plurality of traffic profiles, wherein a first traffic profile of the plurality of traffic profiles comprises a first time series of traffic demand values and the first traffic profile is associated with a first base station situated at a first geographic location, wherein a second traffic profile of the plurality of traffic profiles comprises a second time series of traffic demand values and the second traffic profile is associated with a second base station situated at a second geographic location different from the first geographic location;

obtaining, by clustering over the plurality of traffic profiles, a vector, each element of the vector corresponding to a plurality of representative traffic profiles;

obtaining, for each plurality of representative traffic profiles, one policy of the plurality of policies, and the balancing the load of the target network using the plurality of load balancing parameters comprises performing load balancing of a third base station and a fourth base station using the first policy of the plurality of policies, wherein the target network includes the third base station and the fourth base station.

2. The method of claim 1, wherein the policy selector comprises a feed-forward neural network classifier with three hidden layers and one output layer.

3. The method of claim 2, wherein the method further comprises obtaining the plurality of policies, wherein the first policy of the plurality of policies indicates a first reward which will result when moving from a first state to a second state based on a first action.

4. The method of claim 3, wherein the method further comprises obtaining a plurality of traffic profiles, wherein a first traffic profile of the plurality of traffic profiles is a time series of traffic demand values and the first traffic profile is associated with a first channel of a first base station situated at a first geographic location.

5. The method of claim 4, wherein the method further comprises:

running the plurality of policies on the plurality of traffic profiles and obtaining a plurality of state representations, wherein each state representation includes a plurality of state vectors corresponding to a traffic profile and a policy;

retaining the plurality of state representations as a training set; and training the policy selector based on the training set.

6. The method of claim 5 further comprising:

deploying the plurality of policies and the policy selector to the target network, wherein the target network exhibits traffic profiles not identical to the plurality of traffic profiles; and balancing the load of the target network using the plurality of policies.

7. A server comprising:

one or more processors; and one or more memories, the one or more memories storing a program, wherein execution of the program by the one or more processors is configured to cause the server to at least:

implement a policy selector for selecting a first policy from a policy bank, the policy bank comprising a plurality of policies;

determine a plurality of load balancing parameters based on the first policy and a current traffic state of a target network;

balance, using the plurality of load balancing parameters, a load of the target network for a first period of time;

obtain a plurality of traffic profiles, wherein a first traffic profile of the plurality of traffic profiles comprises a first time series of traffic demand values and the first traffic profile is associated with a first base station situated at a first geographic location, wherein a second traffic profile of the plurality of traffic profiles comprises a second time series of traffic demand values and the second traffic profile is associated with a second base station situated at a second geographic location different from the first geographic location;

obtain, by clustering over the plurality of traffic profiles, a vector, each element of the vector corresponding to a plurality of representative traffic profiles;

obtain, for each plurality of representative traffic profiles, one policy of the plurality of policies, and perform load balancing of a third base station and a fourth base station using the first policy of the plurality of policies, wherein the target network comprises the third base station and the fourth base station.

8. The server of claim 7, wherein the policy selector comprises a feed-forward neural network classifier with three hidden layers and one output layer.

9. The server of claim 8, wherein execution of the program by the one or more processors is further configured to cause the server to obtain the plurality of policies, wherein the first policy of the plurality of policies indicates a first reward which will result when moving from a first state to a second state based on a first action.

10. The server of claim 7, wherein execution of the program by the one or more processors is further configured to cause the server to obtain a plurality of traffic profiles, wherein a first traffic profile of the plurality of traffic profiles is a time series of traffic demand values and the first traffic profile is associated with a first channel of a first base station situated at a first geographic location.

11. The server of claim 10, wherein execution of the program by the one or more processors is further configured to cause the server to at least:

run the plurality of policies on the plurality of traffic profiles and obtaining a plurality of state representations, wherein each state representation includes a plurality of state vectors corresponding to a traffic profile and a policy;

retain the plurality of state representations as a training set; and train the policy selector based on the training set.

12. The server of claim 11 wherein execution of the program by the one or more processors is further configured to cause the server to at least:

deploy the plurality of policies and the policy selector to the target network, wherein the target network exhibits traffic profiles not identical to the plurality of traffic profiles; and balance the load of the target network using the plurality of policies.

13. A non-transitory computer readable medium configured to store a program, wherein execution of the program by one or more processors of a server is configured to cause the server to at least:

implement a policy selector for selecting a first policy from a policy bank, the policy bank comprising a plurality of policies;

determine a plurality of load balancing parameters based on the first policy and a current traffic state of a target network;

balance, using the plurality of load balancing parameters, a load of the target network for a first period of time;

obtain a plurality of traffic profiles, wherein a first traffic profile of the plurality of traffic profiles comprises a first time series of traffic demand values and the first traffic profile is associated with a first base station situated at a first geographic location, wherein a second traffic profile of the plurality of traffic profiles comprises a second time series of traffic demand values and the second traffic profile is associated with a second base station situated at a second geographic location different from the first geographic location;

obtain, by clustering over the plurality of traffic profiles, a vector, each element of the vector corresponding to a plurality of representative traffic profiles;

obtain, for each plurality of representative traffic profiles, one policy of the plurality of policies, and perform load balancing of a third base station and a fourth base station using the first policy of the plurality of policies, wherein the target network comprises the third base station and the fourth base station.

14. The non-transitory computer readable medium of claim 13, wherein the policy selector comprises a feed-- forward neural network classifier with three hidden layers and one output layer.

15. The non-transitory computer readable medium of claim 14, wherein execution of the program by the one or more processors is further configured to cause the server to obtain the plurality of policies, wherein the first policy of the plurality of policies indicates a first reward which will result when moving from a first state to a second state based on a first action.

16. The non-transitory computer readable medium of claim 15, wherein execution of the program by the one or more processors is further configured to cause the server to obtain a plurality of traffic profiles, wherein a first traffic profile of the plurality of traffic profiles is a time series of traffic demand values and the first traffic profile is associated with a first channel of a first base station situated at a first geographic location.

*    *    *    *    *